US010416388B2

(12) United States Patent
Kataoka et al.

(10) Patent No.: US 10,416,388 B2
(45) Date of Patent: Sep. 17, 2019

(54) OPTICAL WAVEGUIDE DEVICE

(71) Applicant: Sumitomo Osaka Cement Co., Ltd, Tokyo (JP)

(72) Inventors: Yuu Kataoka, Tokyo (JP); Yoichi Hosokawa, Tokyo (JP); Norikazu Miyazaki, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 15/938,145

(22) Filed: Mar. 28, 2018

(65) Prior Publication Data
US 2018/0284351 A1 Oct. 4, 2018

(30) Foreign Application Priority Data

Mar. 30, 2017 (JP) .................................. 2017-069256

(51) Int. Cl.
*G02B 6/26* (2006.01)
*G02B 6/28* (2006.01)
*G02B 6/122* (2006.01)

(52) U.S. Cl.
CPC .......... *G02B 6/2804* (2013.01); *G02B 6/1228* (2013.01)

(58) Field of Classification Search
CPC .................. G02B 6/1228; G02B 6/125; G02B 2006/12195
See application file for complete search history.

(56) References Cited

U.S. PATENT DOCUMENTS

| 5,058,978 | A | * | 10/1991 | Kondoh | ................. | G02B 6/125 |
| | | | | | | 385/130 |
| 6,934,447 | B2 | * | 8/2005 | Kim | ..................... | G02B 6/1228 |
| | | | | | | 385/43 |
| 7,116,868 | B2 | * | 10/2006 | Hayashi | ............... | G02B 6/1221 |
| | | | | | | 385/45 |
| 9,195,001 | B2 | * | 11/2015 | Hatori | .................. | G02B 6/1228 |
| 9,354,396 | B2 | * | 5/2016 | Baudot | ................ | G02B 6/2813 |

FOREIGN PATENT DOCUMENTS

| JP | 2005-181748 A | 7/2005 |
| JP | 2015181748 A | 10/2015 |
| JP | 2015-191140 A | 11/2015 |
| JP | 2015191140 A | 11/2015 |
| JP | 2016-191820 A | 11/2016 |
| JP | 2016191820 A | 11/2016 |

* cited by examiner

*Primary Examiner* — Ellen E Kim
(74) *Attorney, Agent, or Firm* — Greer, Burns & Crain, Ltd.

(57) ABSTRACT

An optical waveguide device includes a substrate in which an optical waveguide is formed. The optical waveguide has a Y-branched structure in which light beams propagating through a main waveguide are branched into two parts, and a three-branched structure in which the optical waveguide is branched into three waveguides including the main waveguide and two sub-waveguides on both sides of the main waveguide at a front stage of the Y-branched structure. The main waveguide includes a linear waveguide portion in which a waveguide width is constant and a tapered waveguide portion in which the waveguide width gradually increases between the three-branched structure and the Y-branched structure.

6 Claims, 4 Drawing Sheets

OPTICAL WAVEGUIDE DEVICE

CROSS-REFERENCE TO RELATED APPLICATIONS

This application claims the benefit of Japanese Patent Application No. 2017-069256 filed Mar. 30, 2017, the disclosure of which is herein incorporated by reference in its entirety.

BACKGROUND OF THE INVENTION

Field of the Invention

The present invention relates to an optical waveguide device and particularly to an optical waveguide device in which an optical waveguide formed in a substrate has a three-branched structure at a front stage of a Y-branched structure.

Description of Related Art

In recent years, in a field of optical communication or optical measurement, as in an optical modulator, an optical waveguide device, in which an optical waveguide or a control electrode is formed in a substrate such as a lithium niobate substrate and a semiconductor substrate, is frequently used.

In the optical waveguide device, a high-order mode light beam may occur in light beam propagating through an optical waveguide due to arrangement deviation of an optical fiber from which an light wave is input to an optical waveguide, an manufacturing error of the optical waveguide, mode field shape mismatching between the optical fiber and the optical waveguide in the optical waveguide device, and the like, and the high-order mode light beam may propagate through the optical waveguide.

Respective components of the high-order mode light beam and a lowest-order (primary) mode light beam (also referred to as "base mode light beam") interfere with each other, and become fluctuated light beams in which an optical distribution fluctuates along with propagation of light beams. The fluctuated light beams become the cause for unbalance of a branch ratio of light beams in a Y-branched structure of the optical waveguide.

In addition, in a case of an optical waveguide device using a substrate (thin plate) having a thickness of 20 µm or less, the substrate operates as a slab waveguide. According to this, a radiated light beam, a leaked light beam, and the like in the substrate are trapped in a thickness direction of the substrate, and thus an optical distribution of the radiated light beam in the vicinity of the waveguide becomes stronger than that of a thick plate (having a thickness of several hundreds of µm). As a result, fluctuation of the optical waveguide is likely to occur.

To remove the high-order mode light beam, Japanese Laid-open Patent Publication No. 2005-181748 suggests a three-branched structure in which sub-waveguides are provided with a main waveguide interposed therebetween.

In addition, to remove the high-order mode light beam in a more effective manner, Japanese Laid-open Patent Publication No. 2016-191820 suggests a configuration in which two slab waveguides are disposed to be close both sides of the main waveguide in a front stage of the three-branched structure.

FIG. 1 is a schematic view illustrating a shape of an optical waveguide 2 formed in a substrate 1 in the related art. In the optical waveguide, a three-branched structure A in which one optical waveguide is branched into three parts, and a Y-branched structure B in which a main waveguide 20 is further branched into two branched waveguides 22 at a rear stage of the three-branched structure A. A reference numeral 21 represents a sub-waveguide that constitutes the three-branched structure.

As illustrated in FIG. 1, in the optical waveguide device of the related art, the main waveguide from the three-branched structure A to the Y-branched structure B has a tapered shape. The reason for this is because a width of the main waveguide immediately after the three-branched structure is a width appropriate for a primary mode light beam, but in a branched portion of the Y-branched structure, each of the two branched waveguides has a width appropriate for the primary mode light beam, and thus it is necessary to allow the width of the main waveguide 20 to vary to a width approximately two times the above-described width. Furthermore, a shape from a position indicated by a reference numeral C to the three-branched structure A is also set to a tapered shape.

In a region in which the sub-waveguides are close to the main waveguide 20, it is necessary to allow the width of the main waveguide 20 to gradually vary so as to suppress occurrence of a high-order mode light beam, and it is difficult to remove a high-order mode light beam, which is occurred, in the three-branched structure. According to this, for example, it is necessary to set a length of the main waveguide 20 having a tapered shape to 2000 µm or more, and this is an important issue when realizing miniaturization of the optical waveguide device.

In addition, Japanese Laid-open Patent Publication No. 2015-191140 discloses a configuration in which a step difference is formed in the branched portion of the Y-branched structure B as illustrated in FIG. 1. When using the step difference, it is possible to slightly shorten the length of a tapered portion, but it is difficult to basically shorten the length of the main waveguide 20.

SUMMARY OF THE INVENTION

The invention has been made to solve the above-described problem, and an object thereof is to provide an optical waveguide device in which fluctuation of light beams which occurs at a front stage of a Y-branched structure is suppressed and miniaturization is possible.

To accomplish the above-described object, an optical waveguide device of the invention has the following technical characteristics.

(1) According to an aspect of the invention, there is provided an optical waveguide device including a substrate in which an optical waveguide is formed. The optical waveguide has a Y-branched structure in which light beams propagating through a main waveguide are branched into two parts, and a three-branched structure in which the optical waveguide is branched into three waveguides including the main waveguide and two sub-waveguides on both sides of the main waveguide at a front stage of the Y-branched structure. The main waveguide includes a linear waveguide portion in which a waveguide width is constant and a tapered waveguide portion in which the waveguide width gradually increases between the three-branched structure and the Y-branched structure.

(2) In the optical waveguide device according to (1), at a position at which the linear waveguide portion and the tapered waveguide portion are connected to each other, an interval between the main waveguide and the sub-waveguides may be set to 0.7 to 1.4 times a mode field diameter of the main waveguide.

(3) In the optical waveguide device according to (1) or (2), a length of the linear waveguide portion may be 400 μm or more.

(4) In the optical waveguide device according to any one of (1) to (3), a total length of the linear waveguide portion and the tapered waveguide portion may be 2000 μm or less.

(5) In the optical waveguide device according to any one of (1) to (4), a length from an input-side end to a two-branched structure of the optical waveguide may be less than 3000 μm.

(6) In the optical waveguide device according to any one of (1) to (5), a thickness of the substrate may be 20 μm or less.

According to the aspect of the invention, the optical waveguide device includes a substrate in which an optical waveguide is formed. The optical waveguide has a Y-branched structure in which light beams propagating through a main waveguide are branched into two parts, and a three-branched structure in which the optical waveguide is branched into three waveguides including the main waveguide and two sub-waveguides on both sides of the main waveguide at a front stage of the Y-branched structure. The main waveguide includes a linear waveguide portion in which a waveguide width is constant and a tapered waveguide portion in which the waveguide width gradually increases between the three-branched structure and the Y-branched structure. Accordingly, it is possible to provide an optical waveguide device in which fluctuation of light beams, which occurs at a front stage of the Y-branched structure, can be effectively suppressed and miniaturization is possible.

DETAILED DESCRIPTION OF THE INVENTION

Hereinafter, an optical waveguide device according to the invention will be described in detail.

Figure 2:
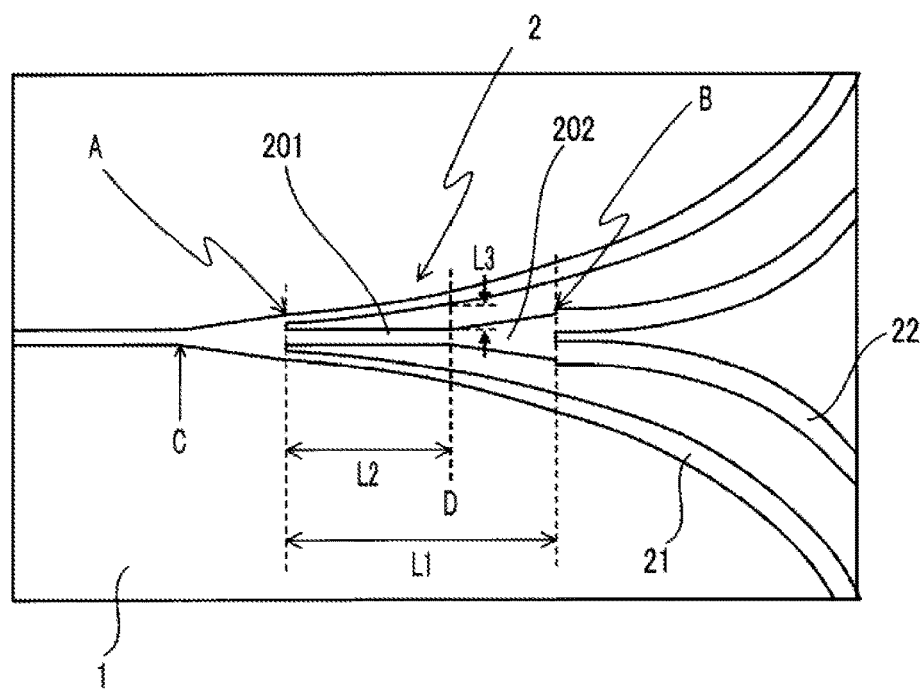
FIG. 2 is a plan view illustrating an overview of a structure of an optical waveguide that is used in an optical waveguide device of the invention.

As illustrated in FIG. 2, the optical waveguide device according to the invention includes a substrate 1 in which an optical waveguide 2 is formed. The optical waveguide device has a Y-branched structure B in which light beams propagating through a main waveguide are branched into two parts, and a three-branched structure A in which the optical waveguide is branched into three waveguides including the main waveguide and two sub-waveguides 21 on both sides of the main waveguide at a front stage of the Y-branched structure. The main waveguide includes a linear waveguide portion 201 in which a waveguide width is constant and a tapered waveguide portion 202 in which the waveguide width gradually increases between the three-branched structure and the Y-branched structure.

As the substrate, a substrate having an electro-optic effect, a semiconductor substrate, a substrate using an EO polymer, and the like can be used. For example, the substrate having the electro-optic effect is constituted by lithium niobate, lithium tantalate, lead lanthanum zirconate titanate (PLZT), and a quartz-based material, and specifically, an X-cut plate, a Y-cut plate, and a Z-cut plate of the single crystal materials. Particularly, it is preferable to use the lithium niobate (LN) when considering it is easy to constitute the optical waveguide device, and anisotropy is large.

In addition, as in a case where a substrate main body operates a slab waveguide, for example, in a case of using a thin plate having a substrate thickness of 20 μm or less, it is preferable to apply the invention to the case.

Furthermore, in the invention, as the thickness of the substrate is smaller, it is possible to expect an effect. The reason for this is because in a case where the substrate is thin, a high-order mode light beam is likely to residue in the vicinity of the main waveguide, and thus it is possible to remove the high-order mode light beam by using a configuration of the invention in a more efficient manner. Specifically, when the thickness of the substrate is in a range of 1 μm to 20 μm, the invention is applicable.

With regard to a method of forming the optical waveguide in the substrate, for example, titanium (Ti) and the like are deposited on the substrate, and are thermally diffused to provide the optical waveguide 2. In addition, it is also possible to form an optical waveguide having a convex shape by forming a ridge along the optical waveguide on the substrate.

Furthermore, a buffer layer formed from silicon oxide ($SiO_2$) configured to reduce absorption of light beams, which propagate through the optical waveguide 2, into an electrode layer, control electrodes (for example, a signal electrode, a ground electrode, and a DC bias electrode) configured to modulate a light wave propagating through the optical waveguide 2 (particularly, a branched waveguide of the Y-branched structure illustrated in FIG. 2), and the like are provided in the substrate, but these components are not illustrated for simplification of explanation.

Figure 1:
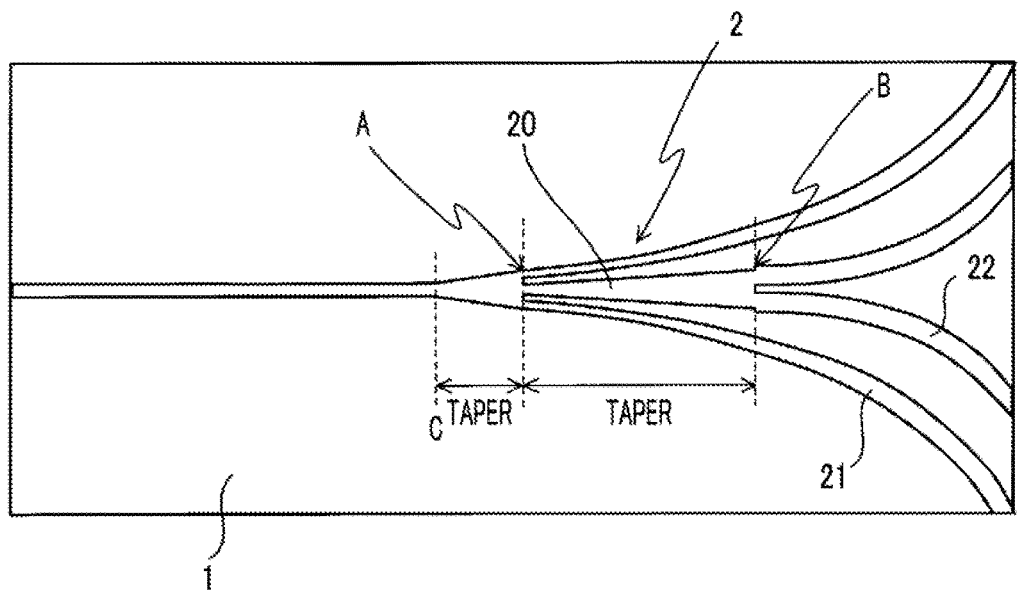
FIG. 1 is a plan view of an optical waveguide in which a three-branched structure that is used in an optical waveguide device of the related art and a Y-branched structure are combined.

The invention has characteristics in which the main waveguide includes the linear waveguide portion in which a waveguide width is constant and the tapered waveguide portion in which the waveguide width gradually increases between the three-branched structure and the Y-branched structure of the optical waveguide. The width of the linear waveguide portion is set to a width for mainly guiding a primary mode light beam (single mode light beam). The width varies in accordance with the thickness of the substrate, a combination of a substrate material and an optical waveguide forming material, and the like, but the width is set to approximately 4 μm, for example, in a case of forming a Ti-diffused waveguide in a lithium niobate substrate having a thickness of 20 µm. Furthermore, similar to FIG. 1, in FIG. 2, a range from a position indicated by a reference numeral C to the three-branched structure A is also set to a tapered shape.

A length L2 of the linear waveguide portion 201 illustrated in FIG. 2 is preferably 400 µm or more to remove a high-order mode light beam and to suppress a fluctuated light beam. In addition, when the linear waveguide portion is lengthened, an optical loss increases, and thus L2 is preferably set to 1000 µm or less. In addition, an interval L3 between the main waveguide and the sub-waveguides is preferably set to 0.7 to 1.4 times a mode field diameter of the main waveguide 201 at a position D at which the linear waveguide portion and the tapered waveguide portion are connected to each other so as to suppress recoupling of a primary mode light beam propagating through the main waveguide and a high-order mode light beam propagating through the sub-waveguides.

In addition, a total length L1 of the linear waveguide portion 201 and the tapered waveguide portion 202 illustrated in FIG. 2 also depends on a length of the linear waveguide portion, but it is preferable to set the total length L1 in a range of 1000 to 2000 µm. Particularly, when the total length L1 is set to 2000 µm or less, it is possible to realize miniaturization of the optical waveguide device.

In the invention, it is possible to effectively remove the high-order mode light beam by a combination of the linear waveguide portion and the tapered waveguide portion in the main waveguide. According to this, it is possible to shorten a length from an input-side end to a two-branched structure B of the optical waveguide on a left end side of the optical waveguide 2 in FIG. 2.

Typically, a light beam input from the input-side end of the optical waveguide is not appropriately coupled to the optical waveguide 2, and thus a high-order mode light beam or a leaked light beam is likely to occur. It is necessary to secure a length from the input-side end to the two-branched structure to a constant length or more so as to remove the high-order mode light beam and the like from the optical waveguide 2. In the configuration illustrated in FIG. 2, the length from the input-side end to the two-branched structure B can be set to be less than 3000 µm.

To verify an effect according to the configuration of the invention, the following test was performed. An optical waveguide was formed through Ti diffusion in a lithium niobate substrate having a thickness of 10 µm, thereby preparing the optical waveguide device illustrated in FIG. 2.

In a first test, the total length L1 of the linear waveguide portion 201 and the tapered waveguide portion 202 illustrated in FIG. 2 was set to 1200 µm, and the length L2 of the linear waveguide portion 201 was changed in a range of 0 to 1000 µm.

Furthermore, an input light beam was input from the input-side end on a left end side of the optical waveguide 2 in a state of being offset from an optical axis of the optical waveguide by 0.5 µm, thereby intentionally generating a fluctuated light beam.

Figure 3:
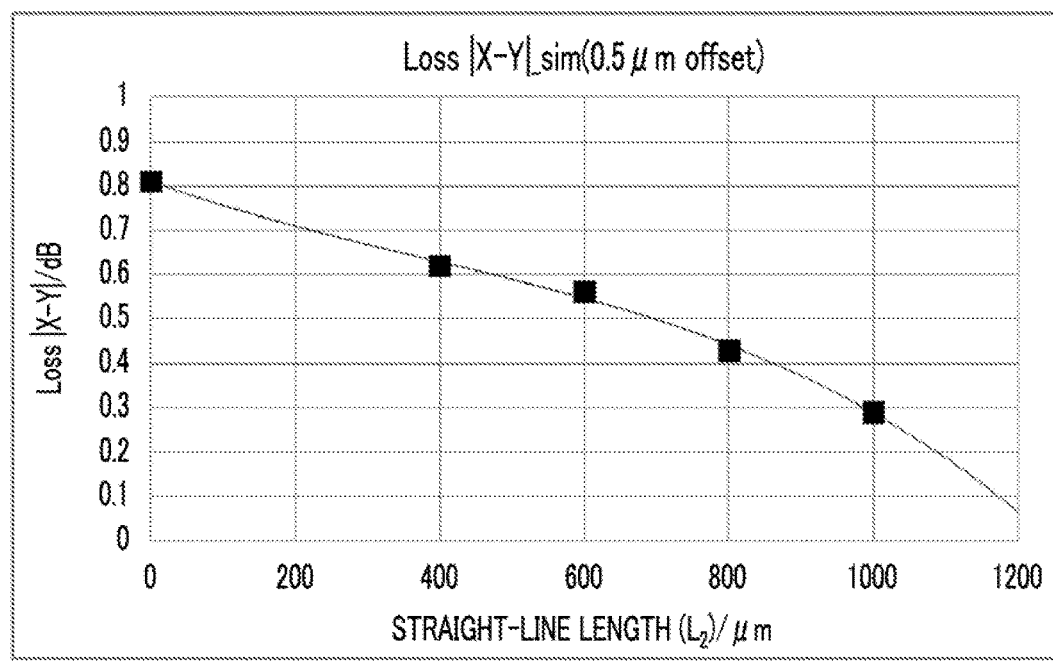
FIG. 3 is a graph illustrating a variation of a branch ratio of a Y-branched structure with respect to a length of a linear waveguide portion immediately after a three-branched structure.

In a graph in FIG. 3, the intensities of respective light beams output from two branched waveguides 22 from in a Y-branched structure are set to Pout_X and Pout_Y, and a difference therebetween is shown as Loss|X−Y| (=|Pout_X−Pout_Y|). In a case of Loss|X−Y|=0, this case represents a state in which the intensities of the light beams emitted from the two branched waveguides are the same as each other, and a branch ratio by the Y-branched structure becomes 1:1.

From the graph in FIG. 3, it can be easily understood that as the length L2 of the linear waveguide portion is lengthened, the Loss|X−Y| decreases, and unbalance of the branch ratio is improved. This represents that the high-order mode light beams is efficiently removed due to presence of the linear waveguide portion. In a case where L2 is 400 µm or more, it can be understood that Loss|X−Y| also decreases to approximately 0.6 dB or less, and it is possible to sufficiently expect an improvement effect.

Figure 4:
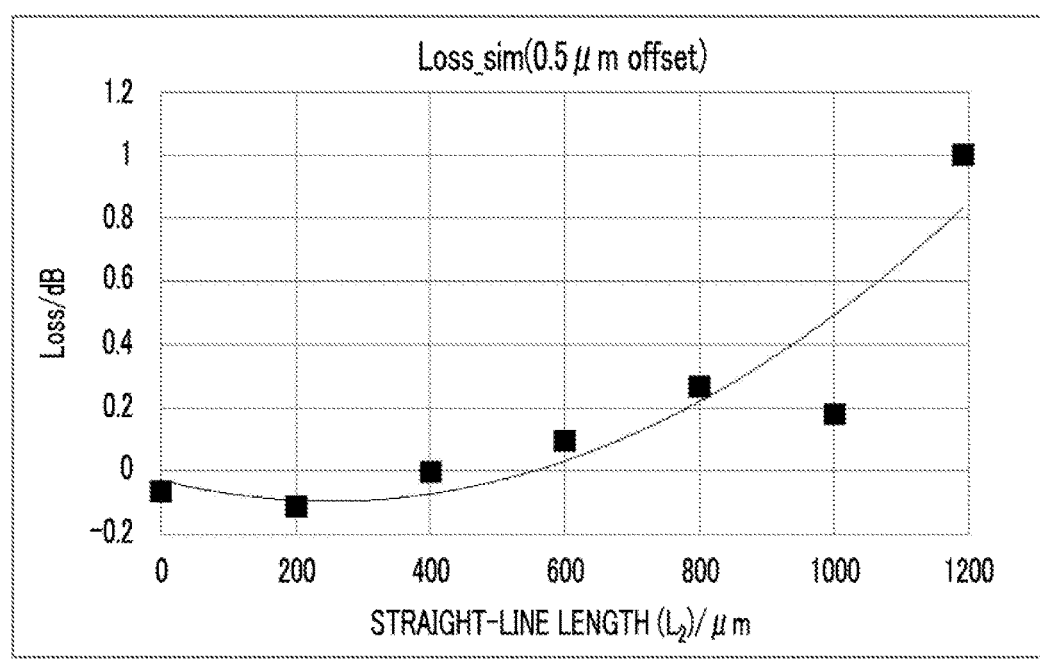
FIG. 4 is a graph illustrating a variation of an optical loss of light beams emitted from one branched waveguide of the Y-branched structure with respect to the length of the linear waveguide portion immediately after the three-branched structure.

In a second test, a variation of the intensity of a light beam output from one of the two branched waveguide 22 was measured to investigate an optical loss amount (Loss) in the optical waveguide 2. FIG. 4 is a graph obtained by investing the variation of the optical loss amount (Loss) with respect to a variation of the length L2 of the linear waveguide portion. The other test conditions are the same as those in the first test. In FIG. 4, the length L2 of the linear waveguide portion 201 was changed in a range of 0 to 1190 µm.

It can be easily understood that as the length L2 of the linear waveguide portion is lengthened, the optical loss amount (Loss) also increases. When L2 is greater than 1000 µm, the optical loss amount rapidly deteriorates. From this point, it is preferable to set the length L2 of the linear waveguide portion to 1000 µm or less.

Next, as a third test, measurement was made on a variation of Loss|X−Y| in a case of changing an input angle of a light beam input to the input-side end of the optical waveguide 2 in FIG. 2. A variation amount of the input angle is shown as "input-angle offset" amount (unit: ° [degree]).

Furthermore, the measurement was performed with respect to a case where L2 is 0 µm, 400 µm, 600 µm, and 1190 µm with regard to a shape of the main waveguide between the three-branched structure and the Y-branched structure. In addition, L1 was set to 1200 µm. Explanatory notes in FIG. 5 represent a numerical value of "L2/(L1−L2)".

Figure 5:
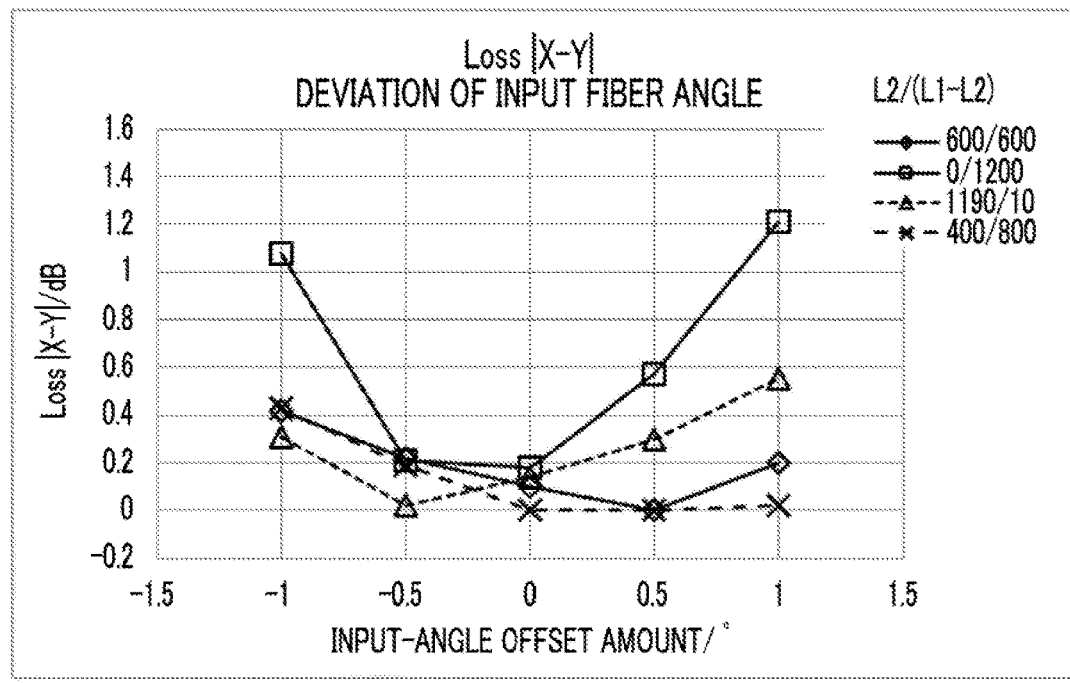
FIG. 5 is a graph illustrating a variation of a branch ratio of the Y-branched structure with respect to an input angle of light beams at an input end of the optical waveguide.

FIG. 5 illustrates results of the third test. From FIG. 5, in a case of an optical waveguide device of the related art in which L2 is 0 µm), it can be easily understood that when the input-angle offset amount varies, a variation of Loss|X−Y| also becomes significant, and thus efficiency of removing the high-order mode light beams is very low. In contrast, in a case where L2 is 400 µm or 600 µm, it can be easily understood that the variation amount of Loss|X−Y| is also suppressed to a range of approximately 0 to 0.4 dB, and thus removal of the high-order mode light beam is efficiently performed.

In addition, in a case where L2 is 1190 µm, it can be understood that the variation amount of Loss|X−Y| also tends to increase. From this point, it is preferable to set L2 to 1000 µm or less.

Figure 6:
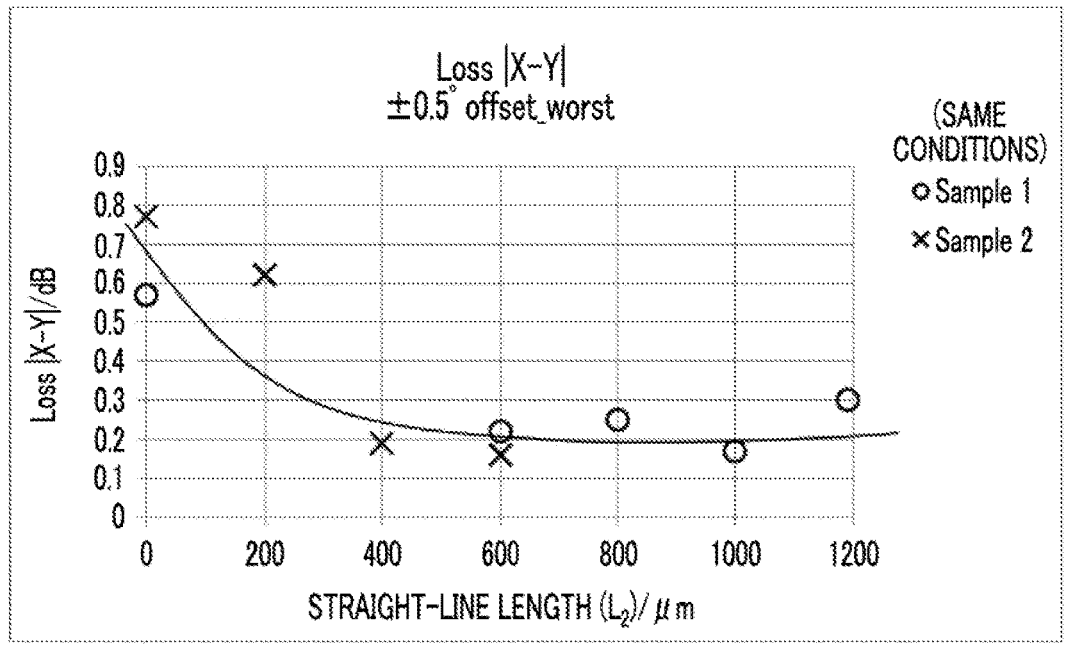
FIG. 6 is a graph illustrating the variation of the branch ratio of the Y-branched structure with respect to the length of the linear waveguide portion immediately after the three-branched structure when the input angle is set to ±0.5°.

As a fourth test, measurement was made on the variation amount of Loss|X−Y| when L2 is changed in a range of 0 to 1190 µm in a case where the input-angle offset used in the third test is set to ±0.5°. In the test, two test specimens (Sample 1 and Sample 2 are test specimens which are prepared in the same design and under the same process conditions and are different in a manufacturing batch). FIG. 6 illustrates the variation amount of Loss|X−Y| in accordance with the variation of L2. From FIG. 6, in a case where L2 is 400 µm or more, it can be easily understood that a variation in the variation amount of Loss|X−Y| enters an approximately normal state.

From the above-described test results, it is preferable that the length L2 of the linear waveguide portion in FIG. 2 is set to a range of 400 µm to 1000 µm.

Figure 7:
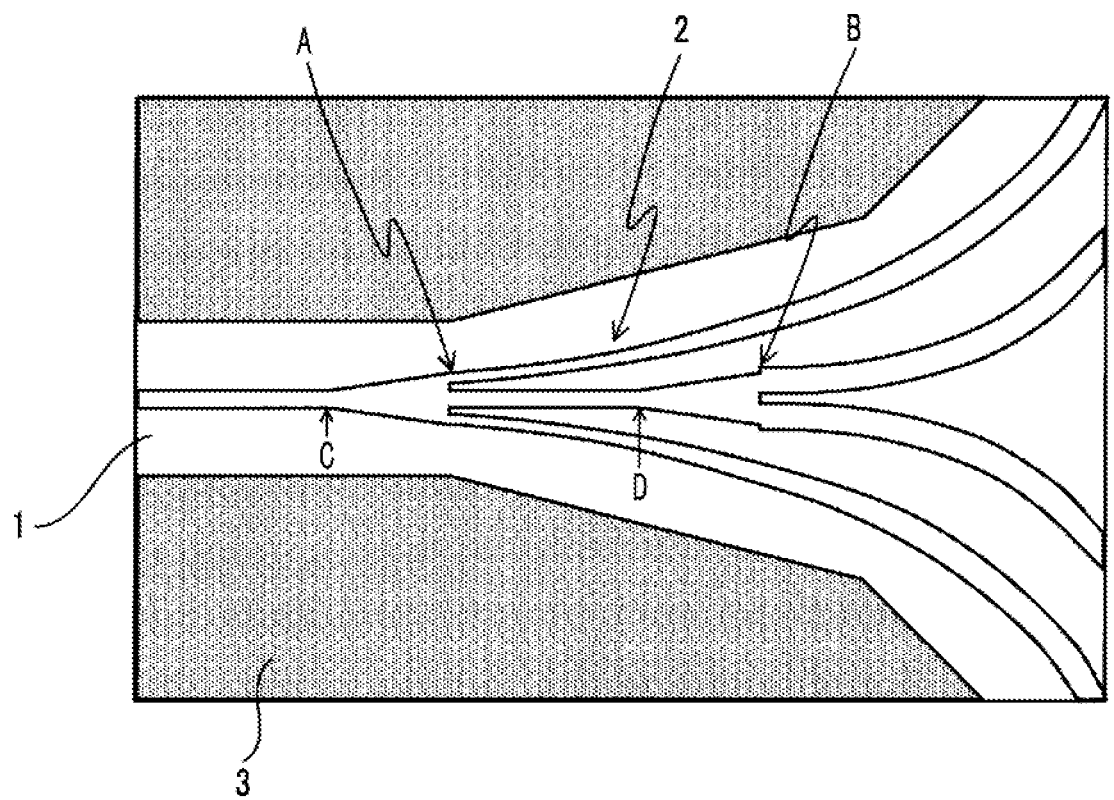
FIG. 7 is a view illustrating an application example of the optical waveguide device of the invention.

In addition, as illustrated in FIG. 7, it is possible to add a technology of removing a high-order mode light beam by the optical waveguide device of the invention by using a slab waveguide 3 as described in Japanese Laid-open Patent Publication No. 2016-191820. In addition, as in Japanese Laid-open Patent Publication No. 2015-191140, it is needless to say that a technology of discontinuously constructing the connection portion B between the tapered waveguide and the two branched waveguides in the Y-branched structure.

As described above, according to the invention, it is possible to provide an optical waveguide device in which fluctuation of light beams which occurs at a front stage of a Y-branched structure is suppressed, and miniaturization is possible.

What is claimed is:

1. An optical waveguide device comprising:
a substrate in which an optical waveguide is formed,
wherein the optical waveguide has a Y-branched structure in which light beams propagating through a main waveguide are branched into two parts, and a three-branched structure in which the optical waveguide is branched into three waveguides including the main waveguide and two sub-waveguides on both sides of the main waveguide at a front stage of the Y-branched structure,
the sub-waveguides remove a high-order mode light beam from the main waveguide,
the main waveguide between the three-branched structure and the Y-branched structure includes a linear waveguide portion in which a waveguide width is constant and a tapered waveguide portion in which the waveguide width gradually increases, and
a length of the linear waveguide portion is 400 µm or more and 1000 µm or less, and
a connection portion, between the tapered waveguide portion and two of said three waveguides in the Y-branched structure, is discontinuously constructed.

2. The optical waveguide device according to claim 1, wherein at a position at which the linear waveguide portion and the tapered waveguide portion are connected to each other, an interval between the main waveguide and the sub-waveguides is set to 0.7 to 1.4 times a mode field diameter of the main waveguide.

3. The optical waveguide device according to claim 1, wherein a total length of the linear waveguide portion and the tapered waveguide portion is 2000 µm or less.

4. The optical waveguide device according to claim 1, wherein a length from an input-side end to a two-branched structure of the optical waveguide is less than 3000 µm.

5. The optical waveguide device according to claim 1, wherein a thickness of the substrate is 20 µm or less.

6. The optical waveguide device according to claim 1, a width of the sub-waveguides is narrower than a width of the main waveguide at a position at which the optical waveguide is branched into said three waveguides.

* * * * *